No. 848,698. PATENTED APR. 2, 1907.
M. B. SMITH.
GUARD OR EXTENSION FOR BAKING PANS.
APPLICATION FILED APR. 26, 1906.
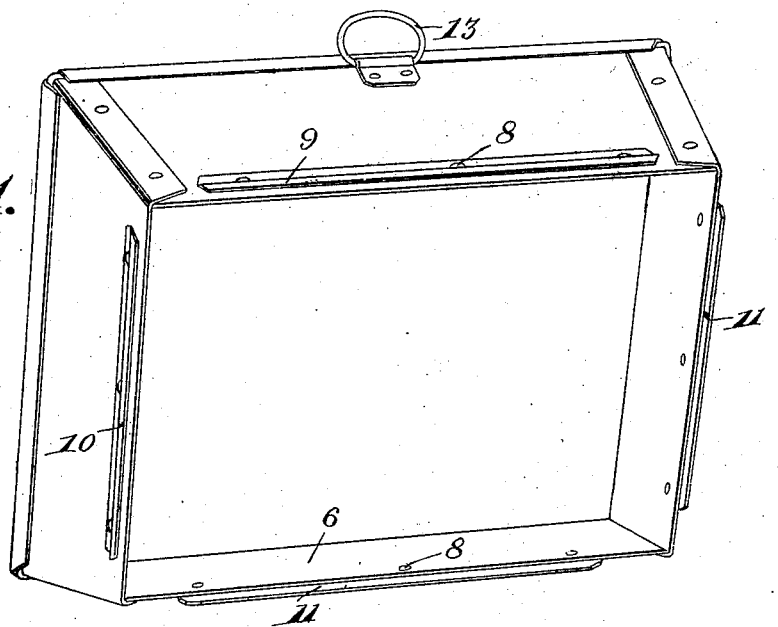
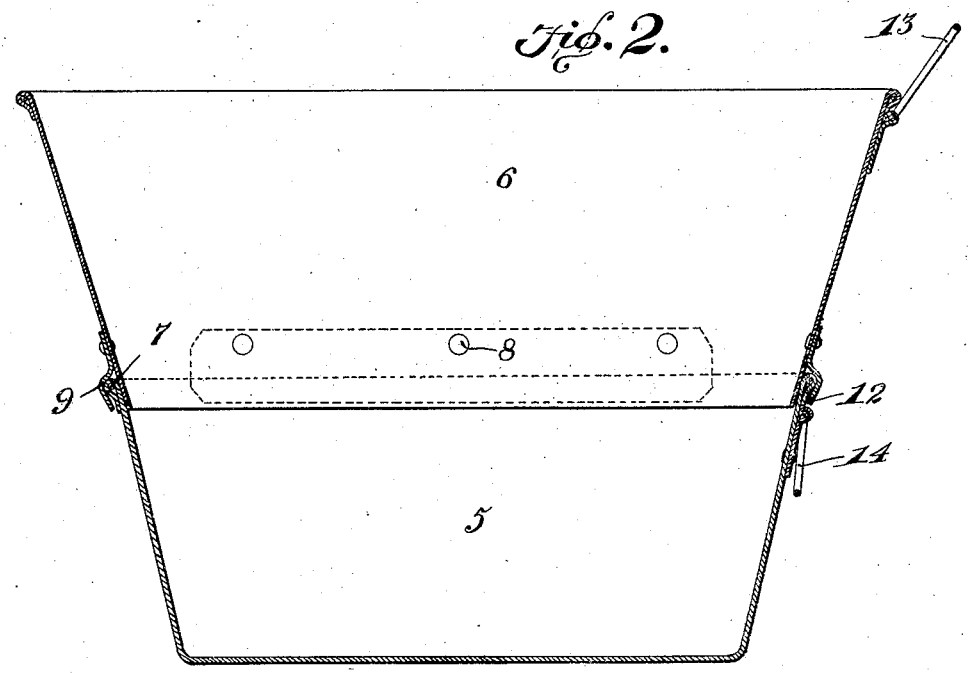
WITNESSES: Mattie B. Smith, INVENTOR.
By C. A. Snow & Co.
ATTORNEYS

UNITED STATES PATENT OFFICE.

MATTIE BAUHAN SMITH, OF LONDON, OHIO.

GUARD OR EXTENSION FOR BAKING-PANS.

No. 848,698.

Specification of Letters Patent.

Patented April 2, 1907.

Application filed April 26, 1906. Serial No. 313,883.

*To all whom it may concern:*

Be it known that I, MATTIE BAUHAN SMITH, a citizen of the United States, residing at London, in the county of Madison and State of Ohio, have invented a new and useful Guard or Extension for Baking-Pans, of which the following is a specification.

This invention relates to baking-pans, and more particularly to a detachable guard or extension for preventing the dough from flowing over the sides of the pan when the bread is placed in the oven to bake.

The object of the invention is to provide a detachable guard or extension having a plurality of spring locking members adapted to engage the upper or free edge of the baking-pan, so as to form, in effect, a continuation of the side and end walls of the latter, and thus prevent the dough from rising and flowing over the sides of the pan during the baking operation.

A further object of the invention is to generally improve this class of devices, so as to increase their utility, durability, and efficiency, as well as to reduce the cost of manufacture.

With these and other objects in view the invention consists in the construction and novel combination and arrangement of parts hereinafter fully described, and illustrated in the accompanying drawings, it being understood that various changes in form, proportions, and minor details of construction may be resorted to within the scope of the appended claim.

In the accompanying drawings, forming a part of this specification, Figure 1 is a perspective view of the improved guard or extension detached. Fig. 2 is a longitudinal sectional view showing the guard or extension locked in position on a baking pan or receptacle.

Similar numerals of reference indicate corresponding parts in all of the figures of the drawings.

The improved device consists of a pan or receptacle comprising a plurality of detachable sections 5 and 6, one of which constitutes a guard or extension for the adjacent section, so as to prevent the dough or other material from rising and flowing over the sides of said section when the bread is placed in the oven to bake. The lower receptacle or section 5 is preferably rectangular in shape and provided with inclined side and end walls, as shown, the upper or free edges of the material forming the walls of the pan being bent downwardly to form a reinforcing-flange 7, defining a pocket or recesses for the reception of a strengthening rod or wire. The side and end walls of the upper section or guard 6 are inclined to conform to the inclination of the walls of the lower section, so as to form, in effect, a continuation of said lower section or receptacle, and thus increase the height of the latter.

Secured to the side and end walls of the upper section or guard 6, as by rivets or suitable fastening devices 8, are longitudinal and transverse spring locking members 9 and 10, each having their free edge spaced laterally from the adjacent wall of the receptacle to form a pocket 11 for the reception of the reinforced edge of the lower receptacle 5. The free edges of the longitudinal plates or locking members 9 and 10 are bent inwardly, as indicated at 12, so that when the guard is placed in position on the lower receptacle the spring locking members will be forced laterally to permit the passage of the reinforcing-flange 7, the inherent spring clamping action of the locking members serving to yieldably grip the flange 7 and support the same within the pocket 11. The upper section or guard 6 is preferably provided with a suitable handle 13, by means of which the guard may be hung on a nail or other suitable support when not in use, while the lower receptacle 5 is also provided with a similar handle 14, as shown.

In operation the dough is placed in the lower receptacle 5 and allowed to rise, after which the extension is placed in position on the lower section 5 by forcing the spring locking members downwardly over the reinforcing-flange 7, thus detachably securing the parts together. It will thus be seen that when the receptacle containing the dough is placed within the oven the extension or guard will effectually prevent the dough from flowing over the sides of the pan and will also cause the bread to bake uniformly and the loaf to retain its proper shape. After the bread is baked the guard or extension may be readily detached by exerting an upward pull on the same, thus permitting the loaf to be readily removed from the lower section or main receptacle.

From the foregoing description it will be seen that there is provided an extremely simple and inexpensive device admirably adapted for the attainment of the ends in view.

Having thus described the invention, what is claimed is—

A baking-pan comprising a pair of substantially rectangular telescopic receptacles each provided with a terminal reinforcing-bead and operating-handle, the lower receptacle being closed at the bottom and provided with inclined side walls converging toward the bottom of the receptacle and adapted to engage correspondingly-inclined side walls of the upper receptacle when said receptacles are assembled, said upper receptacle being open at the top and bottom and provided at its lower longitudinal and transverse edges with reinforcing-plates extending approximately the entire length and width of the upper receptacle and having their free edges spaced from the adjacent walls of said receptacle to form pockets for the reception of the reinforcing-bead of the lower receptacle, the free edges of the reinforcing-plates terminating short of the lower edge of the receptacle and being bent downwardly and inwardly to form spring locking-lips adapted to bear against the reinforcing-bead of the lower receptacle, thereby to prevent accidental displacement of said receptacles.

In testimony that I claim the foregoing as my own I have hereto affixed my signature in the presence of two witnesses.

MATTIE BAUHAN SMITH.

Witnesses:
MAUDE F. CRABBE,
G. W. CRABBE.